March 21, 1967 R. B. BENDER 3,310,615
METHOD FOR PLUGGING PIPE
Filed April 30, 1964

RICHARD B. BENDER
INVENTOR.

BY *Herbert J. Brown*

ATTORNEY

3,310,615
METHOD FOR PLUGGING PIPE
Richard B. Bender, P.O. Box 11302,
Fort Worth, Tex. 76109
Filed Apr. 30, 1964, Ser. No. 363,763
4 Claims. (Cl. 264—45)

This invention relates to plugging pipe underground.

For various reasons water, gas, fuel line and other pipes are abandoned. Due to corrosion, and for other reasons, these pipes develop leaks and thus create hazards. Sometimes they carry contaminated liquids and frequently they carry gas. Heretofore it was necessary to sever the pipe and then plug one or both of the severed ends. Such operation required not only digging down to the pipe but also required digging around the pipe.

In addition to plugging abandoned pipes as referred to, the invention is capable of use in conduits for telephone cables where the cables do not completely fill the conduit diameters. Such use is desirable where there is water seepage. After plugging, the water may be pumped or otherwise removed from the conduit from an open end.

An object of the invention is to provide an easily performed method for plugging pipes underground.

Another object of the invention is to provide a method for the described purpose which materially reduces the amount of equipment required to plug an underground pipe.

A further object of the invention is to provide a method for plugging a pipe requiring a minimum amount of plugging material.

A particular object is to provide, for the described purpose, a plug having high adhesive qualities.

These and other objects of the invention will become apparent from the following description and the accompanying drawing, wherein.

Figure 2:
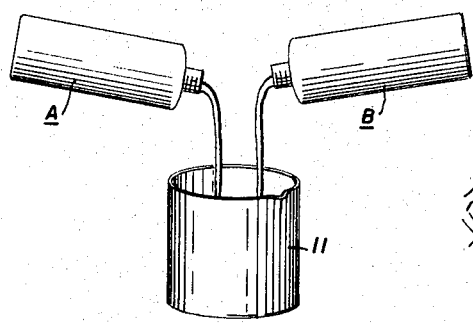
FIGURE 2 is a perspective view of a mixing cup and showing two chemicals being poured therein.
Figure 3:
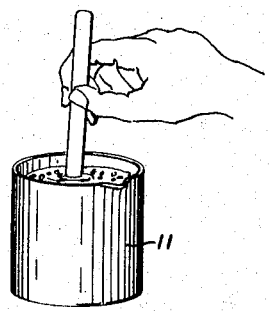
FIGURE 3 is a perspective view of the step of mixing the chemicals after pouring the same in the cup.

The plug 10 may be any of a combination of synthetic resins which, when mixed, catalyze into a cellular foam such as polyurethane, epoxy, polyvinyl chloride, urea formaldehyde and others. It is to be understood that the present invention is not directed to any particular cellular foam or group thereof, but the foam used must have the characteristic of drying, or at least partially drying, and have good adhesive qualities. The mixing of the components A and B in a cup 11 is shown in FIGURES 2 and 3, and since this step is well known to the art the same is not herein described in detail.

The primary feature of the invention is directed to initially confining the mixture within the pipe 12 to be plugged. Access to the interior of the pipe 12 is through an opening, such as the illustrated abandoned service tap 13. The service tap 13 is reached by digging a hole 14 in the earth, and which hole does not have to reach around the pipe 12 as required when the pipe is severed for plugging, as with cement.

Figure 1:
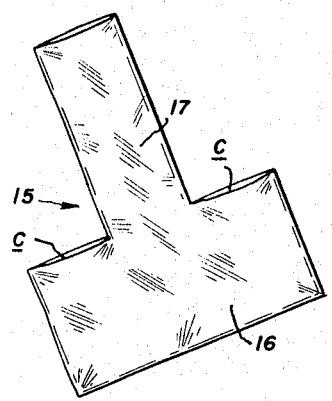
FIGURE 1 is a perspective view of an exemplary expendable bag or container in accordance with the invention.

A preferred means for initially confining the mixture is illustrated in FIGURE 1, and which means is in the form of a thin flexible plastic bag 15. The bag 15 has a pocket portion 16 which is open at its top, as at c, and a neck portion 17 integral with the sides of the pocket portion, but spaced from the ends thereof. While the neck portion 17 is illustrated as a tube, it has been found that the neck may be separated continuations of the walls of the pocket portion 16.

After digging the hole 14, the pocket portion 16 is rolled and inserted through the service tap 13 with the neck portion 17 extending outside to receive the mixture. The bag 15 keeps the mixture in its concentrated volume until the foaming action starts, and at the same time holds the liquid mixture substantially away from the inner surface of the pipe 12, and which surface is most likely to be cold and thus retard the foaming action.

Figure 4:
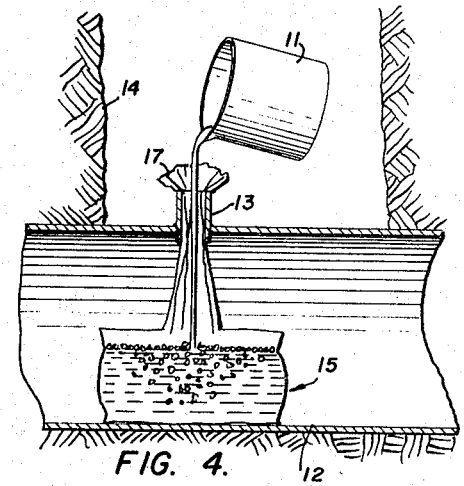
FIGURES 4 through 6 are vertical sections of fragmentary lengths of pipe and showing the steps of forming a plug therein.
Figure 5:
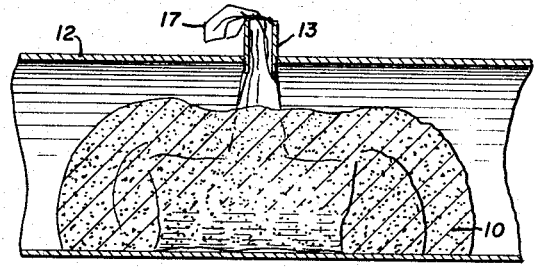
Figure 6:
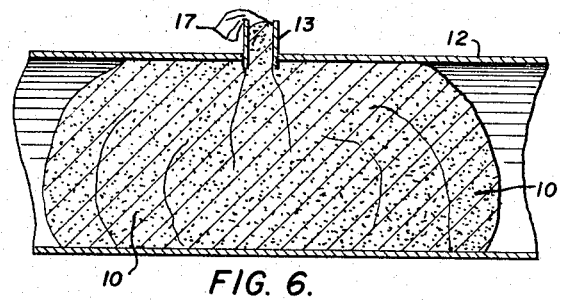

As shown in FIGURE 4, the concentrated mixture is poured from the cup 11 into the pocket portion 16 through the neck portion 17. As the mixed components A and B catalyze, a blowing agent is generated producing a unicellular foam, as illustrated in FIGURE 5. This foam overflows the pocket portion 16 and creates the plug 10 in FIGURE 6. Because of the piling of the foam, there is relatively little loss in the horizontal pipe 12.

Figure 7:
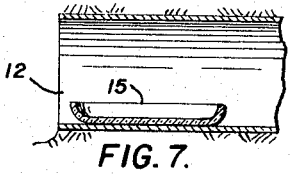
FIGURE 7 is a vertical section of a fragmentary length of pipe in the ground and wherein an end of the pipe is accessible for plugging, for example, in a man hole, and showing a different type of container for holding the mixture before foaming.

In FIGURE 7, where an end of the underground 12 is accessible, an elongate dish 15a is used for holding the mixture instead of the bag 15. Preferably, the dish is made of a low conductor of heat, for example ceramic material. A unicellular foam plug 10 is then produced as described in connection with FIGURES 4–6.

The invention herein described is not restrictive, but may be practiced within various ways within the scope of the appended claims.

What is claimed is:

1. The method of plugging a pipe comprising the steps of placing an expendable open top container therein, and pouring a liquid foamable resin mixture into said container so that said container will initially confine said mixture while in the liquid state, said mixture being of sufficient quantity that the resulting foam overflows said container and fills a transverse section of said pipe.

2. The method defined in claim 1, and wherein said mixture has the characteristic of generating a unicellular foam body capable of adhering to the inner surface of said pipe.

3. The method of defined in claim 1, and wherein said container is inserted in a lateral opening in said pipe prior to said step of pouring said mixture in concentrated form in said container.

4. The method of plugging a pipe as defined in claim 1, and wherein said pipe has an open end, and wherein the placing of said container is through said open end.

References Cited by the Examiner

UNITED STATES PATENTS

| | | | |
|---|---|---|---|
| 2,320,371 | 6/1943 | Manning | 138—89 |
| 2,504,462 | 4/1950 | Strague et al. | 166—179 X |
| 2,609,880 | 9/1952 | Dyer | 166—32 X |

OTHER REFERENCES

E. I. du Pont de Nemours and Co. Catalog, Rigid Urethane Foam, pages 5 and 6, received December 1962.

LAVERNE D. GEIGER, *Primary Examiner.*

E. J. EARLS, *Assistant Examiner.*